W. F. HARRIS.
CASTER.
APPLICATION FILED APR. 6, 1915.
1,156,287.
Patented Oct. 12, 1915.
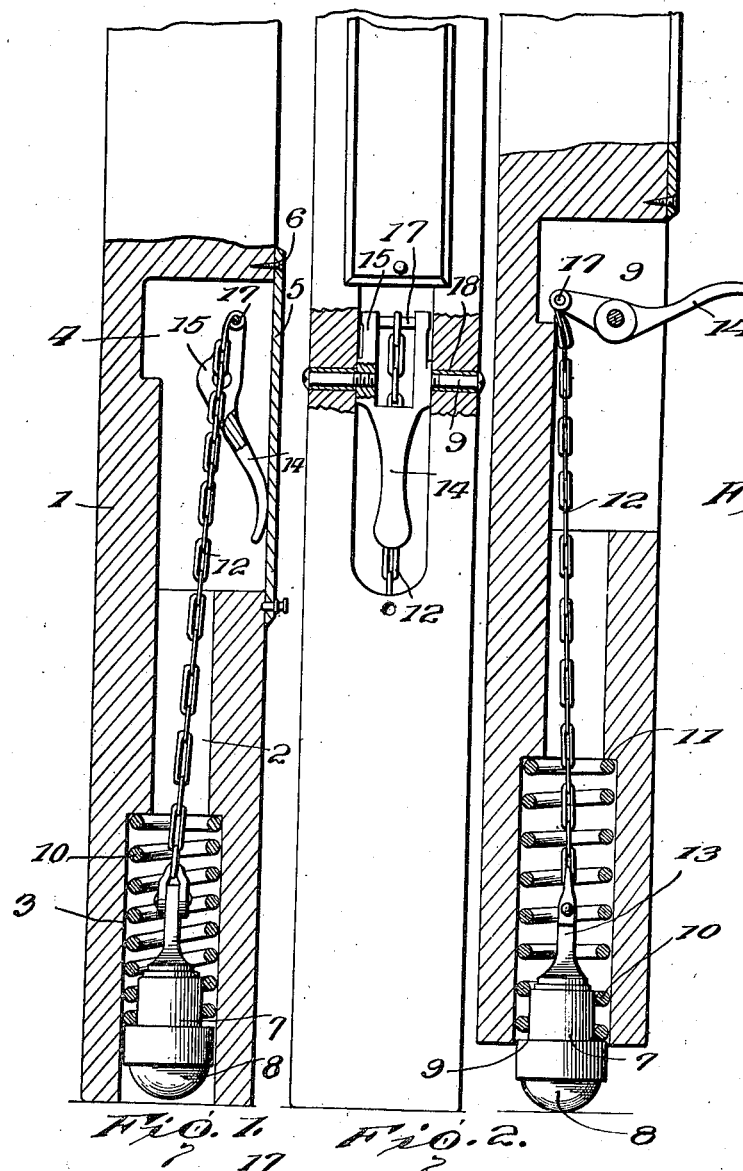
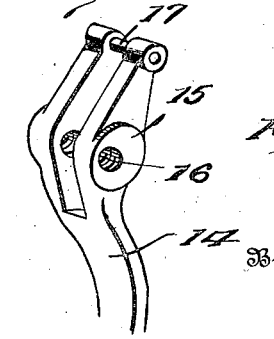
Inventor
W. F. Harris

UNITED STATES PATENT OFFICE.

WILLIAM F. HARRIS, OF SAN FRANCISCO, CALIFORNIA.

CASTER.

1,156,287.

Specification of Letters Patent. Patented Oct. 12, 1915.

Application filed April 6, 1915. Serial No. 19,574.

*To all whom it may concern:*

Be it known that I, WILLIAM F. HARRIS, a citizen of the United States, residing at San Francisco, in the county of San Francisco and State of California, have invented certain new and useful Improvements in Casters, of which the following is a specification.

This invention relates to furniture casters and more particularly to that type which are constructed to be moved into and out of supporting position, and it is one aim of the invention to so construct the caster that it may be readily and quickly adjusted to either of the positions mentioned and which, when not in use, may be entirely concealed.

Another aim of the invention is to so construct the caster that it will not be liable to get out of order and may be readily arranged within the leg or other corresponding part of any article of furniture.

Another aim of the invention is to provide a caster of the type mentioned so constructed that it may be adjusted to supporting position without the necessity of manually lifting the article of furniture.

In the accompanying drawings: Figure 1 is a vertical sectional view illustrating the caster embodying the present invention, the caster being illustrated as adjusted to non-supporting position. Fig. 2 is a view partly in elevation and partly in section illustrating the lever for adjusting the caster. Fig. 3 is a view similar to Fig. 1 but illustrating the caster adjusted to supporting position. for retracting the said member against the lever.

Corresponding and like parts are referred to in the following description and indicated in all the views of the accompanying drawings by the same reference characters.

In the drawings, the numeral 1 indicates the leg or other corresponding portion of an article of furniture and the same is formed with a bore 2, the lower portion of which is enlarged, as at 3, and opens through the lower end of the leg 1 and the upper portion of which bore communicates with a recess formed in the side of the said leg 1. In order that the parts of the caster may be completely concealed from view, when the caster is not in supporting position, a cover plate 5 is swiveled as at 6 to the leg 1 and may be swung to position closing the recess 4 as clearly shown in Fig. 1 of the drawings.

The caster proper comprises a body member 7 having a spherical bearing 8 retained in a socket formed in the lower end of the body. While it is preferable that the caster itself be of the type herein shown, some other type might be equally as well employed if found desirable. The socketed lower portion of the body 7 affords a shoulder 9 which surrounds the said body and against which bears the lower end of a spring 10 which is fitted within the enlarged lower portion of the bore 2, and this spring bearing at its upper end against the shoulder 9 formed at the juncture of the said enlarged portion of the bore with the upper portion thereof. The body member 7 is of a diameter to fit slidably within the enlarged lower portion of the bore and the caster as a whole is received completely within the said portion of the bore when in non-supporting position or, in other words, in the position shown in Fig. 1 of the drawings and when the spring 10 has been compressed. In order that the caster may be retracted against the tension of the spring and also in order that the movement of the caster to supporting position may be limited, a chain or other flexible connection 12 is connected at its lower end to a stem 13 formed at the upper end of the body 7 of the caster and this spring extends within the body 2 and into the recess 4 and is connected at its upper end to the adjusting lever of the device.

The adjusting lever above referred to comprises a handle portion 14 provided at one end with spaced arms 15 having pivot receiving openings 16, the walls of which are threaded. The openings 16 are located near the inner ends of the said arms 15 and these arms are angularly disposed with relation to the handle portion 14. A pin 17 extends between the upper ends of the arms 15 and it is to this pin that the upper end of the chain 12 is connected in the manner clearly shown in Fig. 2 of the drawings. The lever 14 is mounted within the recess 4 and in pivotally supporting the lever, bushings 18 are fitted through the opposite side walls of the recess 4 and pivotally receive pin having threaded ends 20 which fit the openings 16. When the handle portion of the lever is swung downwardly as shown in Fig. 1 of the drawings, an upward pull will be exerted upon the chain 12 and the caster proper will be drawn into the leg 1, the spring 10 being compressed. In this movement of the lever, the chain passes the center about which the lever moves, the upper end of the chain passing between the spaced portions or arms 15 of the said lever, and as the chain has passed dead center the parts will remain in the position shown in Fig. 1. When it is desired to adjust the caster to supporting position, the handle portion of the lever is grasped and the lever is swung upwardly to the position shown in Fig. 3. As the chain 12 is slackened in this movement of the lever, the spring 10 will expand and force the caster to supporting position.

It is contemplated that the springs of the several devices supporting any article of furniture shall have a combined strength sufficient to support the article of furniture and, consequently, it is unnecessary to manually lift the article in adjusting the casters to supporting position. Of course, when it is desired to render the casters inactive it is only necessary to bear downwardly with a slight pressure upon the article of furniture so as to compress the individual springs of the caster devices, at the same time swinging the levers to the position shown in Fig. 1.

Having thus described the invention, what is claimed as new is:

1. The combination with a member to be supported, of a caster member mounted therein and movable into and out of supporting position, a spring coacting with the caster member and tending to project the member to supporting position, and means for retracting said member against the tension of the spring.

2. The combination with a member to be supported, of a caster member mounted therein and movable into and out of supporting position, a spring coacting with the said member and tending to project the same to supporting position, an adjusting lever mounted in the said member, and connection between the lever and the said caster member, the lever being movable to retract the caster member against the tension of the spring and to permit the member to be projected by the expansion of the spring.

3. The combination with a member to be supported, of a caster member mounted therein and movable into and out of supporting position, a spring bearing at one end against the member and tending to project the same to supporting position, a lever mounted within the member above the spring, and a flexible connecting element connected to the lever and to the said caster member and extending within the spring.

4. The combination with a member to be supported, of a caster member mounted therein and movable into and out of supporting position, means tending to project the member to supporting position, a lever pivotally mounted within the said member and having a handle portion and spaced portions, the pivot for the lever being located adjacent the inner ends of the spaced portions thereof, a pin extending between the outer ends of the said spaced portions, and a flexible element connected to the said pin and to the said caster member.

5. The combination of a member to be supported provided with a bore and with a recess in communication with the upper end of the bore, of a caster member slidably disposed within the lower portion of the bore, a spring bearing at its lower end against the caster member and at its upper end against an abutment within the bore, a lever pivotally mounted within the recess and having arms extending at opposite sides of its pivot, one arm constituting a handle member for swinging the lever, and a flexible element connected to the other arm of the lever and to the said caster member and extending within the bore and within the said spring.

In testimony whereof I affix my signature in presence of two witnesses.

WILLIAM F. HARRIS. [L. S.]

Witnesses:
W. T. HESS,
THOMAS E. MCCARTHY.